United States Patent
Liu

(10) Patent No.: US 10,965,384 B2
(45) Date of Patent: Mar. 30, 2021

(54) METHOD AND SYSTEM FOR SUPPRESSING AN INTERFERENCE SIGNAL DURING DETECTION OF A CHIRP SIGNAL

(71) Applicant: Robert Bosch GmbH, Stuttgart (DE)

(72) Inventor: Wenqing Liu, Weil der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/765,437

(22) PCT Filed: Nov. 14, 2018

(86) PCT No.: PCT/EP2018/081144
§ 371 (c)(1),
(2) Date: May 19, 2020

(87) PCT Pub. No.: WO2019/101586
PCT Pub. Date: May 31, 2019

(65) Prior Publication Data
US 2020/0328826 A1    Oct. 15, 2020

(30) Foreign Application Priority Data
Nov. 22, 2017 (DE) .................. 10 2017 220 828.7

(51) Int. Cl.
*H04B 15/00* (2006.01)
*H04B 3/54* (2006.01)
*H04L 7/033* (2006.01)

(52) U.S. Cl.
CPC .............. *H04B 15/00* (2013.01); *H04B 3/54* (2013.01); *H04L 7/033* (2013.01)

(58) Field of Classification Search
CPC ............ H04B 15/00; H04B 3/54; H04L 7/033
See application file for complete search history.

(56) References Cited

U.S. PATENT DOCUMENTS

2004/0052319 A1* 3/2004 Wakamatsu ........ H04L 27/2675
                                                                  375/343
2006/0233225 A1* 10/2006 Omoto .................... H04L 7/042
                                                                  375/149
(Continued)

FOREIGN PATENT DOCUMENTS

CN          105553511         5/2016
DE          102012007874      10/2012
(Continued)

OTHER PUBLICATIONS

International Search Report for Application No. PCT/EP2018/081144 dated Feb. 5, 2019 (English Translation, 2 pages).

*Primary Examiner* — Kabir A Timory
(74) *Attorney, Agent, or Firm* — Michael Best & Friedrich LLP

(57) ABSTRACT

The invention relates to a method for suppressing an interference signal during detection of a chirp signal from an input signal (X), comprising the following steps: a. recording the input signal (X); b. calculating an output signal (R1) as a correlation from the recorded input signal (X) and a chirp reference signal (CR) by means of a correlator (30); c. calculating a magnitude (XB) of the input signal (X) from the input signal (X); d. calculating a magnitude (R1B) of the output signal (R1) from the output signal (R1); e. calculating a phase difference (P) between the input signal (X) and the output signal (R1); f. calculating a synthesized interference signal (R2) from the magnitude (XB) of the input signal (X), the magnitude (R1B) of the output signal (R1) and the phase difference (P) by means of a rotator (60); g. calculating a residual signal (DR) as the difference between the output signal (R1) and the synthesized interference signal (R2). The invention relates to a system (10) for suppressing an inter- (Continued)

ference signal during detection of a chirp signal by means of the method according to the invention.

10 Claims, 4 Drawing Sheets

(56) References Cited

U.S. PATENT DOCUMENTS

2013/0322584 A1* 12/2013 Kumar ................ H04L 27/2688
                                                    375/349
2014/0112398 A1   4/2014 Kamalizad et al.
2015/0103931 A1   4/2015 Yanagisawa et al.

FOREIGN PATENT DOCUMENTS

EP    1011234    6/2000
WO    9619056    6/1996

* cited by examiner

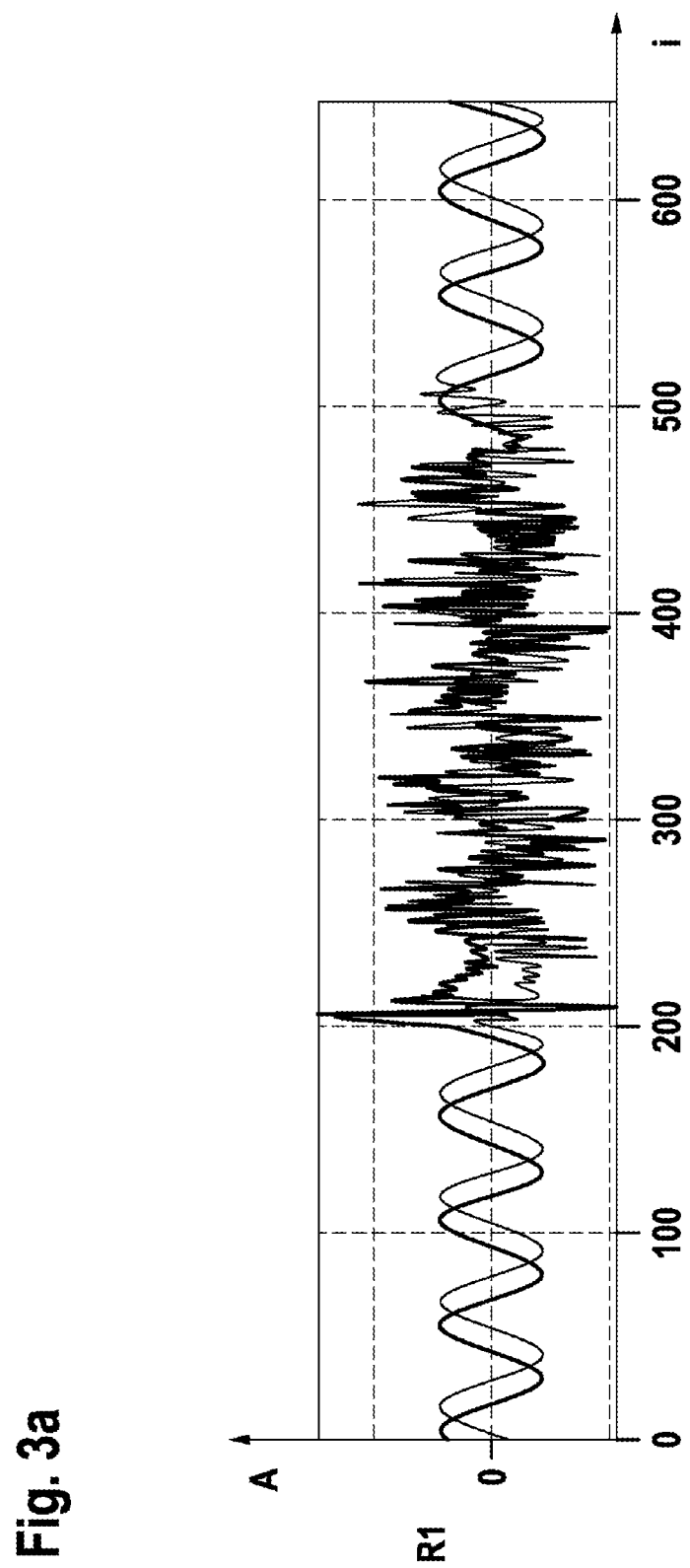

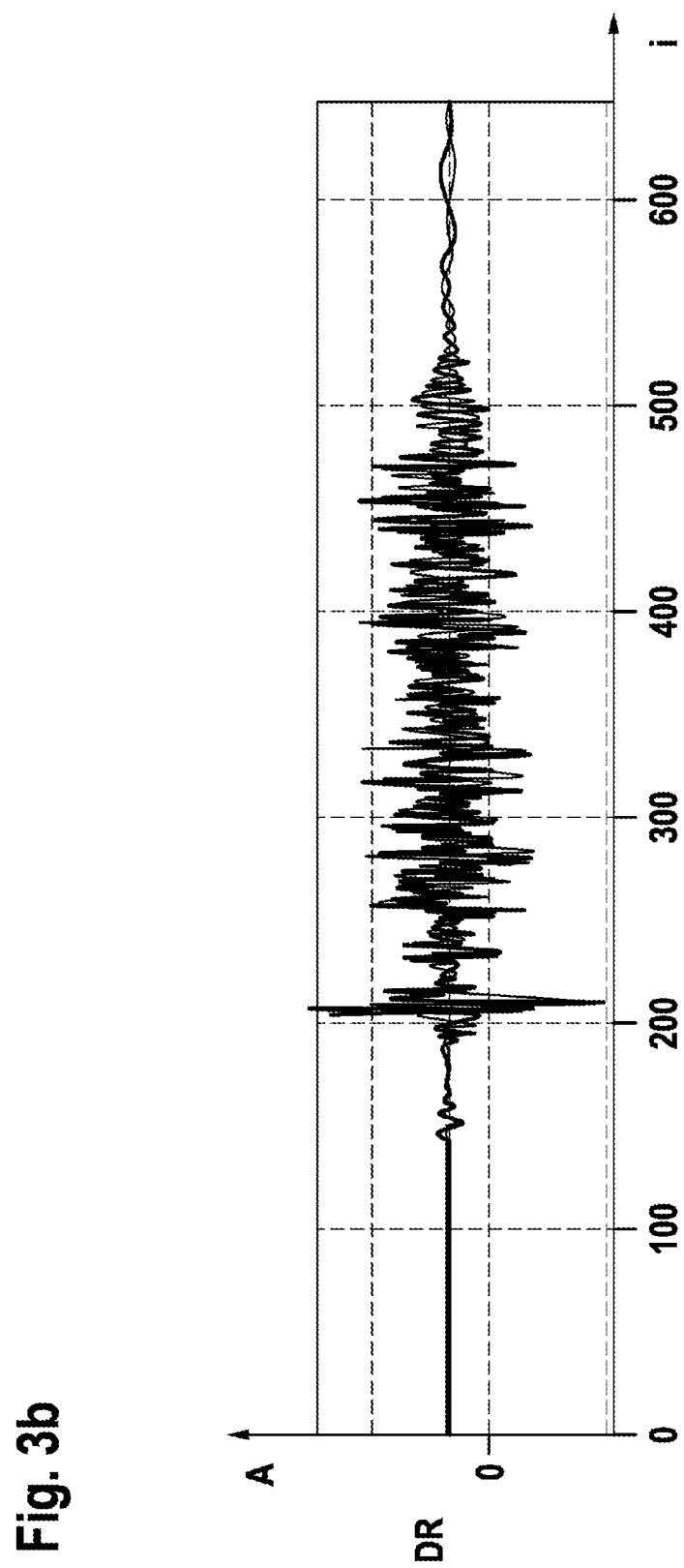

METHOD AND SYSTEM FOR SUPPRESSING AN INTERFERENCE SIGNAL DURING DETECTION OF A CHIRP SIGNAL

BACKGROUND OF THE INVENTION

The invention relates to a method for rejecting an interference signal when detecting a chirp signal from an input signal. The invention also relates to a system for rejecting an interference signal when detecting a chirp signal from an input signal.

When data are transmitted via bus systems, it is customary to transmit complete data packets. Such a data packet comprises for example a chirp signal at the start of a data packet followed by useful data. In this case, a transmitter produces the data packet, which comprises a defined chirp signal and the useful data. A receiver detects the defined chirp signal and processes the useful data that follow. This allows synchronization of data packets between transmitters and receivers when data are transmitted via the bus system.

Such transmission of data is employed for a multiplicity of bus systems, for example in powerline systems, in which power transmission and data transmission take place via the same lines. The document "Specification for PowerLine Intelligent Metering Evolution", R1.4, inter alia, from PRIME Alliance TWG discloses the practice of using chirp signals for synchronization.

The document EP 1 011 234 A1 discloses an OFDM (orthogonal frequency-division multiplexing) system that comprises a radio-frequency receiver. For the purpose of synchronization, there is provision for a correlator that performs a correlation between a received signal and a defined chirp signal.

When data are transmitted via bus systems, interference, in particular in the form of interference signals, can arise. Interference signals are coupled in via data lines, for example, which act as antennas. Coupled-in interference signals are overlaid on the data signals, as result of which the transmitted data can be altered. The detection of chirp signals is also hampered by interference signals.

A chirp signal is normally sinusoidal. Detection of the chirp signal is particularly hampered if coupled-in interference signals have an identical or similar frequency to the chirp signal that is to be detected. Reliable detection of the chirp signal is essential for the synchronization when transmitting data, however.

US 2014/0112398 discloses an OFDM synchronizer for a data transmission by means of Powerline. In this case, the synchronizer comprises a correlator that performs multiplication of an input signal by a locally stored chirp reference signal.

A method for receiving chirp signals on a receiver device is also known from DE 10 2012 007 874 A1. In this case, a received chirp signal is multiplied by a generated chirp signal. The mix signal thus obtained is subsequently correlated with a chirp reference signal.

CN 105553511 discloses a method for rejecting interference signals for a wideband transmission system that is based on nonlinear chirp pulses. In this case, the wide band used for data transmission is divided into multiple narrow bands, and separate chirp pulses are used in the narrow bands for synchronization.

SUMMARY OF THE INVENTION

A method for rejecting an interference signal when detecting a chirp signal from an input signal is proposed. The method is usable in different bus systems for data transmissions, in particular in Powerline systems. The method according to the invention comprises multiple steps, which are explained below:

First of all, the input signal is picked up. The input signal is a useful signal on which an interference signal has been overlaid. The useful signal comprises data packets that each comprise a defined chirp signal and useful data.

Preferably, the input signal is picked up by sampling an analog signal. This involves the analog signal being sampled at prescribed, in particular equidistant, intervals of time, and individual values are stored that form the input signal. The individual values of the input signal in this case are complex values having a real part and an imaginary part.

Subsequently, an output signal is computed as a correlation from the picked-up input signal and a chirp reference signal by means of a correlator. The correlation involves for example a defined number of values of the input signal being multiplied by an applicable number of values of the chirp reference signal.

The individual values of the chirp reference signal are also complex values having a real part and an imaginary part. The individual values of the output signal are therefore also complex values having a real part and an imaginary part. The values of the input signal, the values of the chirp reference signal and the values of the output signal are also representable as vectors having an absolute value and a phase angle.

Further, an absolute value of the input signal is computed from the picked-up input signal. In this case, the computation of the absolute value of the input signal is performed for the defined number of sampled values of the input signal that have the values of the output signal computed for them.

Similarly, an absolute value of the output signal is computed from the previously computed output signal. The computation of the absolute value of the output signal is performed for the previously computed values of the output signal in this case.

Further, a phase difference between the input signal and the output signal is computed. The computation of the phase difference is performed for the defined number of sampled values of the input signal with the respectively associated values of the output signal in this case.

Subsequently, a synthesized interference signal is computed. The synthesized interference signal is computed from the absolute value of the input signal, the absolute value of the output signal and the phase difference between the input signal and the output signal. The synthesized interference signal is computed by means of a rotator. The synthesized interference signal is a replica of the interference signal in this case.

The computation of the synthesized interference signal is performed for the defined number of sampled values of the input signal with the respectively associated values of the output signal and the respectively associated values of the phase difference in this case. The individual values of the synthesized interference signal are therefore also complex values having a real part and an imaginary part. The values of the synthesized interference signal are also representable as vectors having an absolute value and a phase angle.

Subsequently, a residual signal is computed. The residual signal is computed as a difference from the output signal and the synthesized interference signal by means of a subtractor in this case. The computation of the residual signal is performed for the computed values of the output signal with the respectively associated values of the synthesized interference signal in this case. Computation of this difference advantageously increases the signal-to-noise ratio. The quality of the replica of the interference signal plays an important part in this case.

In accordance with one advantageous refinement of the invention, the chirp signal is then detected from the residual signal.

In accordance with another advantageous refinement of the invention, an absolute value of the residual signal is computed from the residual signal. The computation of the absolute value of the residual signal is performed for the previously computed values of the residual signal in this case. The chirp signal is then detected from the absolute value of the residual signal.

In accordance with one advantageous development of the invention, a mean value is generated from multiple values of the absolute value of the input signal, said mean value then being used as absolute value of the input signal for computing the synthesized interference signal.

In accordance with a further advantageous development of the invention, a mean value is generated from multiple values of the absolute value of the output signal, said mean value then being used as absolute value of the output signal for computing the synthesized interference signal.

In accordance with another advantageous development of the invention, a mean value is generated from multiple computed values of the phase difference, said mean value then being used as phase difference for computing the synthesized interference signal.

In accordance with one preferred refinement of the invention, the chirp reference signal has a frequency that varies over time.

A system for rejecting an interference signal when detecting a chirp signal from an input signal is also proposed. The system is usable in various bus systems for data transmission, in particular in Powerline systems.

The system comprises a correlator for computing an output signal as a correlation from a picked-up input signal and a chirp reference signal. The correlation involves for example a defined number of values of the input signal being multiplied by an applicable number of values of the chirp reference signal.

The individual values of the input signal, the individual values of the chirp reference signal and the individual values of the output signal are each complex values having a real part and an imaginary part. The values of the input signal, the values of the chirp reference signal and the values of the output signal are also representable as vectors having an absolute value and a phase angle.

The system also comprises an absolute-value generator for computing an absolute value of the input signal from the input signal.

The system also comprises an absolute-value generator for computing an absolute value of the output signal from the output signal.

The system further comprises a phase estimator for computing a phase difference between the input signal and the output signal.

The system likewise comprises a rotator for computing a synthesized interference signal from the absolute value of the input signal, the absolute value of the output signal and the phase difference.

The system likewise comprises a subtractor for computing a residual signal as a difference from the output signal and the synthesized interference signal.

In accordance with one advantageous development of the invention, the system also comprises an absolute-value generator for computing an absolute value of the residual signal from the residual signal.

Preferably, the system also comprises a sampler for picking up the input signal by sampling an analog signal. The sampler samples the analog signal at prescribed, in particular equidistant, intervals of time and stores individual values of the input signal.

In accordance with one advantageous development of the invention, the system comprises an averaging unit for computing a mean value from multiple values of the absolute value of the input signal.

In accordance with a further advantageous development of the invention, the system comprises an averaging unit for computing a mean value from multiple values of the absolute value of the output signal.

In accordance with another advantageous development of the invention, the system comprises an averaging unit for computing a mean value from multiple values of the phase difference.

SUMMARY OF THE INVENTION

The method according to the invention and the system according to the invention allow reliable rejection of interference signals when detecting chirp signals from input signals. It is therefore possible for data to be transmitted via a bus system robustly and with low susceptibility to interference. In particular, synchronization of data packets between transmitters and receivers when transmitting data via the bus system has low susceptibility to interference, even if a coupled-in interference signal has an identical or similar frequency to the chirp signal that is to be detected. The method is of mathematically relatively simple form and requires only relatively low computing power. The method is therefore particularly suitable for realtime applications. The method according to the invention and the system according to the invention are usable not exclusively for the transmission of data via bus systems but also in other applications. Examples that may be mentioned in this case are navigation and range measurement.

BRIEF DESCRIPTION OF THE DRAWINGS

Embodiments of the invention are explained in more detail on the basis of the description that follows and the drawings, in which:

FIG. 3a shows an exemplary time characteristic for an output signal of a correlator when detecting a chirp signal, and FIG. 3b shows an exemplary time characteristic for a residual signal when detecting a chirp signal.

DETAILED DESCRIPTION

In the description of the embodiments of the invention that follows, identical or similar elements are denoted by the same reference signs, these elements not being described again in some cases. The figures depict the subject matter of the invention only schematically.

Figure 1:
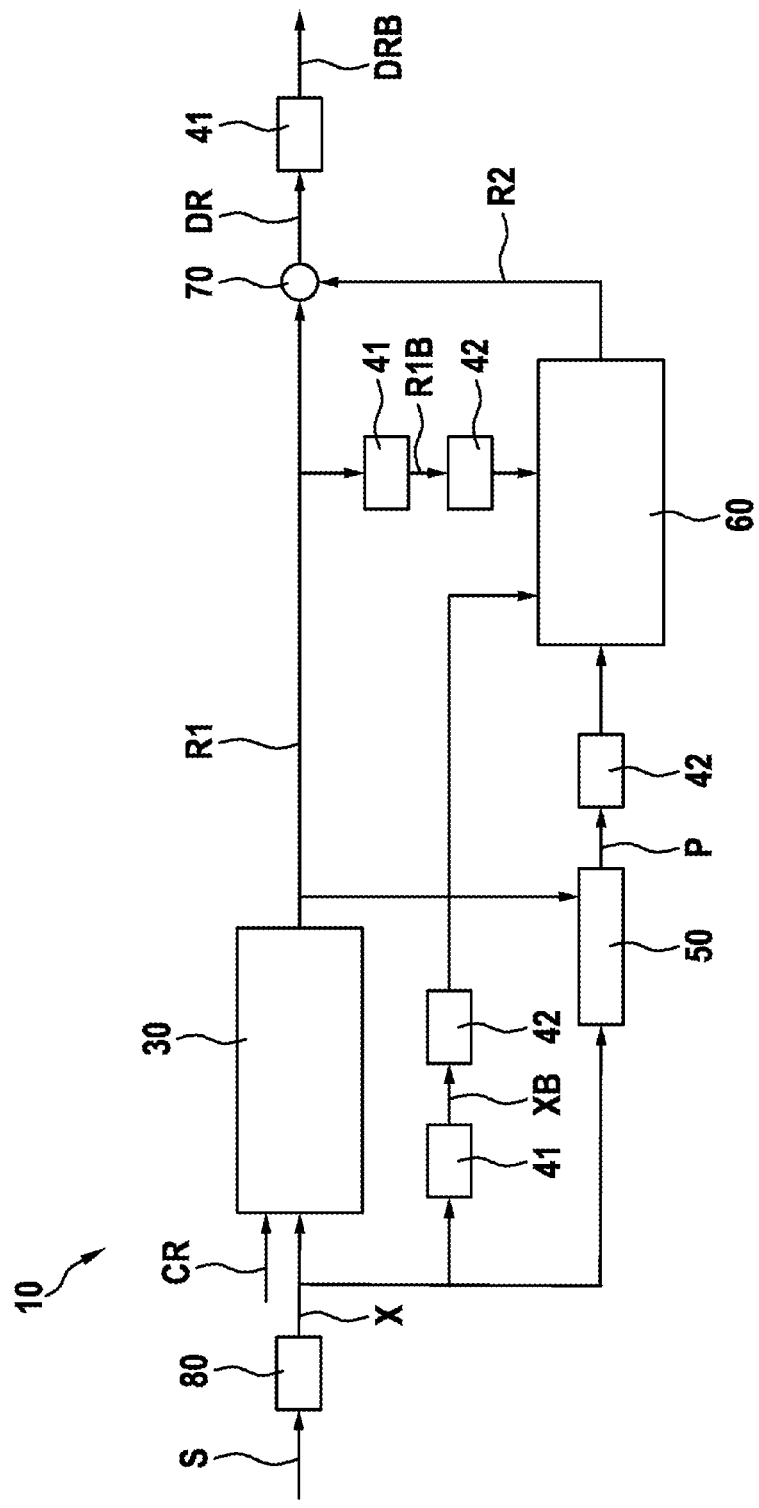
FIG. 1 shows a schematic depiction of a system for rejecting an interference signal.

FIG. 1 shows a schematic depiction of a system 10 for rejecting an interference signal. The system 10 comprises a sampler 80 for sampling an analog signal S. The analog signal S is a useful signal on which an interference signal has been overlaid. The useful signal comprises data packets that each comprise a defined chirp signal and useful data. The sampler 80 samples the analog signal S at equidistant intervals of time and stores individual values $x_i$ that form an input signal X.

The system 10 further comprises a correlator 30 for computing an output signal R1 as a correlation from the picked-up input signal X and a chirp reference signal CR. The correlation in the correlator 30 involves a defined number n of values $x_i$ of the input signal X being multiplied by an applicable number n of values $c_i$ of the chirp reference signal CR.

The correlation performed in the correlator 30 is described mathematically as follows, with a sequential index i being used:

$$R1 = \frac{\sum_{i=1}^{n} x_i \cdot c_i}{\sqrt{\sum_{i=1}^{n} x_i^2 \cdot \sum_{i=1}^{n} c_i^2}}$$

The system 10 comprises an absolute value generator 41 for computing an absolute value XB of the input signal X from the input signal X. The system 10 likewise comprises an averaging unit 42 for computing a mean value from multiple values of the absolute value XB of the input signal X.

The system 10 comprises an absolute value generator 41 for computing an absolute value R1B of the output signal R1 from the output signal R1. The system 10 likewise comprises an averaging unit 42 for computing a mean value from multiple values of the absolute value R1B of the output signal R1.

The system 10 further comprises a phase estimator 50 for computing a phase difference P between the input signal X and the output signal R1. The system 10 likewise comprises an averaging unit 42 for computing a mean value from multiple values of the phase difference P.

The system 10 likewise comprises a rotator 60 for computing a synthesized interference signal R2 from the absolute value XB of the input signal X, the absolute value R1B of the output signal R1 and the phase difference P. The operation performed in the rotator 60 can be described mathematically as follows:

$$R2 = X \, e^{jP} R1B/XB$$

Further, the system 10 comprises a subtractor 70 for computing a residual signal DR as a difference from the output signal R1 and the synthesized interference signal R2. The operation of the subtractor 70 can be described mathematically as follows:

$$DR = R1 - R2$$

The residual signal DR can be used to detect the chirp signal. In the present case, however, the system 10 also comprises an absolute value generator 41 for computing an absolute value DRB of the residual signal DR from the residual signal DR. The chirp signal is then detected from the absolute value DRB of the residual signal DR.

Figure 2:
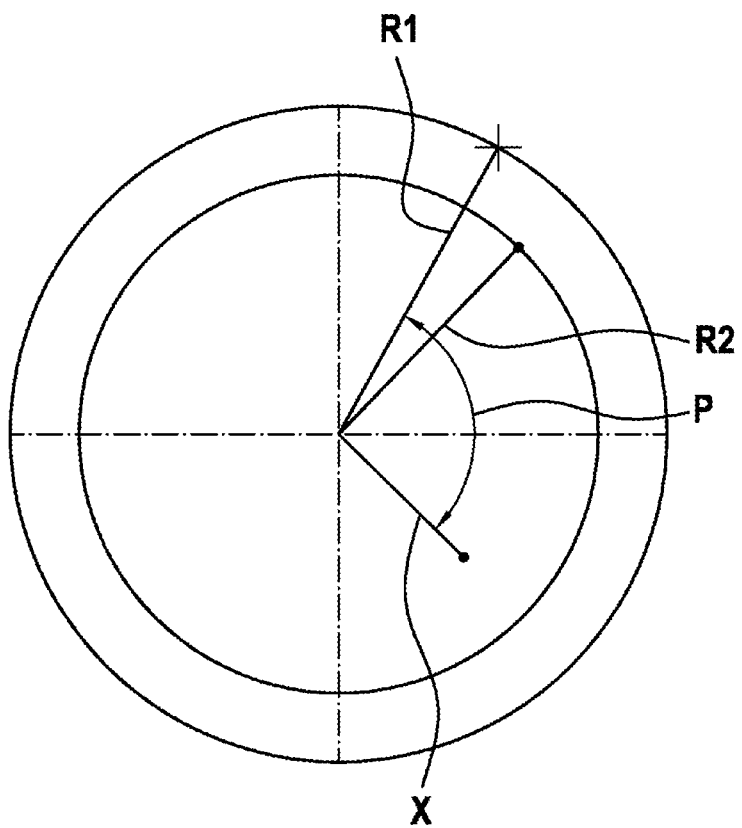
FIG. 2 shows an exemplary depiction of multiple values processed in the system from FIG. 1 as vectors.

The values of the input signal X, the values of the output signal R1 and the values of the synthesized interference signal R2 are also representable as vectors having an absolute value and a phase angle. FIG. 2 shows an exemplary depiction of the input signal X, the output signal R1 and the synthesized interference signal R2, which are processed in the system 10 from FIG. 1, as vectors. The phase difference P computed in the phase estimator 50 corresponds in this case to an angle between the vector of the input signal X and the vector of the output signal R1.

FIG. 3a shows an exemplary time characteristic for an output signal R1 when detecting a chirp signal using a graph. In this case, an amplitude A is plotted on the ordinate of the graph and the sequential index i is plotted on the abscissa of the graph. The real part of the output signal R1 and the imaginary part of the output signal R1 are depicted separately in the graph in this case. Approximately at the time of the $220^{th}$ value of the output signal R1, that is to say approximately when the sequential index i assumes the value 220, the chirp signal is detected in the present case.

FIG. 3b shows an exemplary time characteristic for a residual signal DR when detecting a chirp signal using a graph. In this case, an amplitude A is plotted on the ordinate of the graph and the sequential index i is plotted on the abscissa of the graph. The real part of the residual signal DR and the imaginary part of the residual signal DR are depicted separately in the graph in this case. Approximately at the time of the $220^{th}$ value of the residual signal DR, that is to say approximately when the sequential index i assumes the value 220, the chirp signal is detected in the present case.

It can be seen from the depiction in FIG. 3b that, in comparison with the time characteristic depicted in FIG. 3a for the output signal R1, the amplitude A of the residual signal DR is distinctly lower before the detection of the chirp signal, that is to say before the sequential index i assumes the value 220. The ratio of the amplitude A of the residual signal DR when the chirp signal is detected to the amplitude A of the residual signal DR before the chirp signal is detected is therefore distinctly higher than the ratio of the amplitude A of the output signal R1 when the chirp signal is detected to the amplitude A of the output signal R1 before the chirp signal is detected.

The invention is not restricted to the exemplary embodiments described here and the aspects highlighted therein. Rather, a multiplicity of modifications that are within the realms of action of a person skilled in the art are possible within the scope indicated by the claims.

The invention claimed is:

1. A method for rejecting an interference signal when detecting a chirp signal from an input signal (X), the method comprising:
   a. picking up the input signal (X);
   b. computing an output signal (R1) as a correlation from the picked-up input signal (X) and a chirp reference signal (CR) via a correlator (30);
   c. computing an absolute value (XB) of the input signal (X) from the input signal (X) via an absolute-value generator (41);
   d. computing an absolute value (R1B) of the output signal (R1) from the output signal (R1);
   e. computing a phase difference (P) between the input signal (X) and the output signal (R1);
   f. computing a synthesized interference signal (R2) from the absolute value (XB) of the input signal (X), the absolute value (R1B) of the output signal (R1) and the phase difference (P) by means of a rotator (60); and
   g. computing a residual signal (DR) as a difference from the output signal (R1) and the synthesized interference signal (R2).

2. The method as claimed in claim 1, wherein the chirp signal is detected from the residual signal (DR).

3. The method as claimed in claim 1, wherein
an absolute value (DRB) of the residual signal (DR) is computed from the residual signal (DR), and
the chirp signal is detected from the absolute value (DRB) of the residual signal (DR).

4. The method as claimed in claim 1, wherein
the input signal (X) is picked up by sampling an analog signal (S).

5. The method as claimed in claim 1, wherein
a mean value is generated from multiple values of the absolute value (XB) of the input signal (X), and/or wherein
a mean value is generated from multiple values of the absolute value (R1B) of the output signal (R1) and/or wherein
a mean value is generated from multiple values of the phase difference (P).

6. The method as claimed in claim 1, wherein
the chirp reference signal (CR) has a frequency that varies over time.

7. A system (10) for rejecting an interference signal when detecting a chirp signal from an input signal (X), comprising:
- a correlator (30) for computing an output signal (R1) as a correlation from a picked-up input signal (X) and a chirp reference signal (CR);
- an absolute-value generator (41) for computing an absolute value (XB) of the input signal (X) from the input signal (X);
- an absolute-value generator (41) for computing an absolute value (R1B) of the output signal (R1) from the output signal (R1);
- a phase estimator (50) for computing a phase difference (P) between the input signal (X) and the output signal (R1);
- a rotator (60) for computing a synthesized interference signal (R2) from the absolute value (XB) of the input signal (X), the absolute value (R1B) of the output signal (R1) and the phase difference (P); and
- a subtractor (70) for computing a residual signal (DR) as a difference from the output signal (R1) and the synthesized interference signal (R2).

8. The system (10) as claimed in claim 7, further comprising
an absolute-value generator (41) for computing an absolute value (DRB) of the residual signal (DR) from the residual signal (DR).

9. The system (10) as claimed in claim 7, further comprising
a sampler (80) for picking up the input signal (X) by sampling an analog signal (S).

10. The system (10) as claimed in claim 7, further comprising:
- an averaging unit (42) for computing a mean value from multiple values of the absolute value (XB) of the input signal (X),
- an averaging unit (42) for computing a mean value from multiple values of the absolute value (R1B) of the output signal (R1),
- an averaging unit (42) for computing a mean value from multiple values of the phase difference (P), or a combination of the same.

* * * * *